UNITED STATES PATENT OFFICE.

HERMAN L. HARTENSTEIN, OF CHICAGO, ILLINOIS, ASSIGNOR, BY MESNE ASSIGNMENTS, TO ELECTRO CHEMICAL & DEVELOPMENT COMPANY, OF PIERRE, SOUTH DAKOTA, A CORPORATION OF SOUTH DAKOTA.

METHOD OF PRODUCING CARBID.

No. 819,220. Specification of Letters Patent. Patented May 1, 1906.

Application filed July 23, 1902. Renewed September 30, 1905. Serial No. 280,725.

*To all whom it may concern:*

Be it known that I, HERMAN L. HARTENSTEIN, a citizen of the United States, residing at Chicago, in the county of Cook and State of Illinois, have invented a new and useful Carbid and Method of Producing the Same, of which the following is a specification.

This invention relates to carbid and method of producing the same.

In the manufacture of calcium carbid as ordinarily practiced lime or limestone is fused with carbon in an electric or other furnace and the material is reduced to liquid form by intense heat. When the mass has been sufficiently liquefied under the heat to which it is subjected, the heat-supply is arrested, or the molten mass is otherwise permitted to cool slowly, usually in the electric or other furnace in which the melting operation is carried on, and the cooled product is removed and is prepared for commercial use in the manufacture of acetylene or other gas. This method is open to several serious practical objections. In the first place when the molten mass is permitted to cool slowly the resulting product is of crystalline formation or character, full of blow or air holes, and the product is porous or coarse-grained, so to speak, thereby enabling the carbid produced to readily absorb moisture from the air while being crushed and packed for shipment or from the water tank or reservoir employed in the manufacture of gas therefrom, thereby not only deteriorating the carbid and rapidly exhausting the same of its gas-producing quality, but also resulting in the generation of gas while being stored or when not required for use, and hence resulting in waste as well as in rendering a gas-generating plant or carbid-storage tank or reservoir unsafe. Again, the portion of material in the electric or other furnace which is reduced to melted condition is usually much smaller in quantity than the amount or quantity of material supplied to the furnace, and consequently the melted portion is usually surrounded by or inclosed in a large mass of unmelted material, which, however, has been heated to a high degree and which consequently cools slowly. It frequently occurs that this unmelted material surrounding the melted portion adheres as a crust or casing to the melted portion and being unfit for use for gas-generating purposes is required to be chipped off or removed from the pure carbid before the latter is broken or crushed and packed for shipment or use. This necessitates not only the arresting of the furnace operation during the cooling period, but also necessitates the labor involved in chipping off or removing the crust, which labor involves the additional disadvantage of danger to the hands of the operators employed for this purpose, thereby greatly adding to the expense of manufacture of the carbid as well as resulting in the production of an inferior quality of finished product, and in any case when the finished product is broken up or crushed ready for packing, shipment, or use the percentage of "fines" or small particles of carbid which are undesirable for shipment or use is very large.

It is among the special purposes of my present invention to avoid these difficulties and objections and to produce a carbid having a comparatively hard stone or flint-like structure which is not objectionably porous and not nearly so hygroscopic in its nature as the crystalline product and which during the crushing or breaking operation does not yield so large a percentage of fines, but produces a much larger percentage of the larger or merchantable sizes.

In carrying out my invention I propose to tap the electric or other furnaces in which the fusing or melting operation takes place or otherwise run off therefrom the molten mass and permitting the same to flow into chilled molds or over chilled plates or to spread out into a comparatively thin sheet, whereby the molten mass of pure carbid, free from adhering particles of unmelted or unconverted material, is enabled and permitted to chill or cool quickly or within a very few minutes' time. In this manner I avoid the long delays of from ten to twenty-four hours or longer which has heretofore been found necessary to effect the cooling of the melted material. I also avoid the necessity for chipping off or removing any inclosing crust of unconverted material, and I avoid the crystalline formation in the finished product, and I secure a carbid which is of a hardened stone or flinty nature, capable of resisting the absorption of moisture during the crushing, breaking, packing, shipping, and storing or use of the finished product and at the same time am enabled to crush or break the carbid into larger particles or pieces for commercial use, thereby avoiding the waste due to the large percentage of fines heretofore encountered.

It is to be understood that my invention is not to be limited to the character of materials employed to produce the molten mass. For instance, lime, limestone, or any calcium bearing or containing ore or compound may be employed, and similarly any carbonaceous or carbon bearing or containing substance may be used, such as coal, coke, charcoal, and the like.

Having now set forth the object and nature of my invention and the method of operation involved in carrying the same into practical operation, what I claim as new and useful and of my own invention, and desire to secure by Letters Patent, is—

In the manufacture of carbid, the method which consists in fusing lime and carbon containing elements to reduce the same to molten condition, and finally running off the molten mass into thin sheets to chill the same.

In witness whereof I have hereunto set my hand, this 14th day of July, 1902, in the presence of the subscribing witnesses.

HERMAN L. HARTENSTEIN.

Witnesses:
 FRANK T. BROWN,
 S. E. DARBY.